(12) United States Patent
Chen et al.

(10) Patent No.: US 12,015,358 B2
(45) Date of Patent: Jun. 18, 2024

(54) PORTABLE CHARGING DEVICE WITH KINETIC ENERGY RECOVERY

(71) Applicant: Southwest Jiaotong University, Chengdu (CN)

(72) Inventors: Zhengge Chen, Chengdu (CN); Jianping Xu, Chengdu (CN); Songrong Wu, Chengdu (CN)

(73) Assignee: Southwest Jiaotong University, Chengdu (CN)

( * ) Notice: Subject to any disclaimer, the term of this patent is extended or adjusted under 35 U.S.C. 154(b) by 199 days.

(21) Appl. No.: 17/880,557

(22) Filed: Aug. 3, 2022

(65) Prior Publication Data

US 2023/0283206 A1 Sep. 7, 2023

(30) Foreign Application Priority Data

Mar. 1, 2022 (CN) .......................... 202210193282.6

(51) Int. Cl.
*H02K 7/00* (2006.01)
*H02J 7/00* (2006.01)
*H02M 1/00* (2006.01)
*H02M 7/217* (2006.01)
*H02N 11/00* (2006.01)
*H02K 5/00* (2006.01)

(52) U.S. Cl.
CPC .......... *H02N 11/002* (2013.01); *H02J 7/0013* (2013.01); *H02J 7/0042* (2013.01); *H02K 7/00* (2013.01); *H02M 1/0012* (2021.05); *H02M 7/217* (2013.01); *H02J 2207/20* (2020.01); *H02K 5/00* (2013.01)

(58) Field of Classification Search
None
See application file for complete search history.

(56) References Cited

U.S. PATENT DOCUMENTS

| | | | | |
|---|---|---|---|---|
| 8,350,394 B2* | 1/2013 | Cottone | .................. | H02N 2/186 |
| | | | | 290/1 R |
| 8,704,387 B2* | 4/2014 | Lemieux | .................. | F03G 7/08 |
| | | | | 290/1 R |
| 9,331,559 B2* | 5/2016 | Shastry | ................. | H02J 7/0068 |
| 9,484,786 B2* | 11/2016 | Ruff | ....................... | H02K 35/02 |
| 11,437,886 B2* | 9/2022 | Taylor | ...................... | H02K 7/02 |

(Continued)

*Primary Examiner* — Courtney L Smith
(74) *Attorney, Agent, or Firm* — Marshall Lerner; Brad Mattes; Kleinberg & Lerner LLP.

(57) ABSTRACT

The disclosure provides a portable charging device with kinetic energy recovery comprising a machine body, a kinetic energy recovery component, an AC-DC electric energy conversion component, and an energy storage component. The kinetic energy recovery component is embedded in the machine body by a locking assembly, and comprises a ring body, two springs, a conductor coil, a permanent magnet sphere, a guide rod, two sealing covers, and two bumps. The two sealing covers are symmetrically and fixedly attached to both sides of the ring body, and the middle part of the ring body and the two sealing covers form a vacuum cavity. The energy storage component is arranged at the right side of the machine body. The AC-DC electric energy conversion component is arranged at the bottom side of the machine body, and two first conductive blocks are electrically connected to the AC-DC electric energy conversion component.

7 Claims, 13 Drawing Sheets

(56) References Cited

U.S. PATENT DOCUMENTS

2009/0051229 A1\* 2/2009 Shau ................ H02K 35/02
  310/15
2017/0133953 A1\* 5/2017 Gross ................ H02N 2/181

\* cited by examiner

PORTABLE CHARGING DEVICE WITH KINETIC ENERGY RECOVERY

CROSS REFERENCE TO RELATED APPLICATION

This patent application claims the benefit and priority of Chinese Patent Application No. 2022101932826 filed on 1 Mar. 2022 and entitled "PORTABLE CHARGING DEVICE WITH KINETIC ENERGY RECOVERY", which is incorporated herein by reference herein in its entirety as part of the present application.

TECHNICAL FIELD

The present disclosure relates to the technical field of charging equipment, in particular, relates to a portable charging device with kinetic energy recovery.

BACKGROUND ART

At present, there are more mature energy recovery devices on street lights, electric vehicles, high-speed trains, and other large electricity-using equipment, such as brake recovery on electric vehicles and high-speed trains, and solar photovoltaic panels on street lights. However, there lack inventions and applications of energy recovery devices for personal consumer devices such as cell phones, laptops, wireless mice, electronic watches, and even electric vehicles. Therefore, the development of kinetic energy, vibration, and other energy recovery devices for personal consumer devices has the following important significance.

An existing small kinetic energy recovery device mainly adopts a combination of a mechanical energy recovery component and a small generator to generate a low-voltage and low-frequency AC output voltage, and then a stable low-voltage (e.g., 5V) output voltage is achieved by an Alternating Current-Direct Current (AC-DC) electric energy conversion circuit for the use of a post-stage battery, a load and the like. As an employed mechanical structure has certain friction and mechanical energy loss, the recovery rate of energy is reduced, and thus the low-frequency and low-voltage AC input needs to be efficiently converted into stable DC electric energy to achieve efficient electric energy conversion.

SUMMARY

1. A Technical Problem to be Solved by the Present Disclosure

An objective of the present disclosure is to provide a portable charging device with kinetic energy recovery to solve the problems proposed in the background art:
1) An energy recovery rate is reduced as an employed mechanical structure has certain friction and mechanical energy loss.
2) How the generated low-voltage and low-frequency electric energy is converted into stable DC electric energy efficiently.

2. Technical Solutions

To achieve the above objective, the following technical solutions are provided:

A portable charging device with kinetic energy recovery comprises a machine body, a kinetic energy recovery component, an AC-DC electric energy conversion component, and an energy storage component. The kinetic energy recovery component is embedded in the machine body by a locking assembly, and comprises a ring body, two springs, a conductor coil, a permanent magnet sphere, a guide rod, two sealing covers, and two bumps. The ring body is oval. The two bumps are symmetrically and fixedly installed inside the ring body. The guide rod is perpendicularly arranged between the two bumps, and both ends of the guide rod are fixedly nested in the two bumps respectively. The guide rod is slidingly sleeved outside by the permanent magnet sphere. The guide rod is sleeved outside by the two springs. Ends, close to each other, of the two springs are fixedly connected to both ends of the permanent magnet sphere. Ends, away from each other, of the two springs are fixedly connected to surfaces, close to each other, of the two bumps. The conductor coil is a wire and is symmetrically, fixedly and hermetically wound on both sides of the ring body. Both ends of the conductor coil are electrically connected with two first conductive blocks, and the two first conductive blocks are fixedly embedded in the ring body. The two sealing covers are symmetrically and fixedly attached to both sides of the ring body, and a middle part of the ring body and the two sealing covers form a vacuum cavity. The energy storage component is arranged at the right side of the machine body. The AC-DC electric conversion component is arranged at the bottom side of the machine body, and the two first conductive blocks are electrically connected to the AC-DC electric energy conversion component.

The replacement of the kinetic energy recovery component can be achieved by means of the locking assembly. In one embodiment, the locking assembly comprises a first clamping block, two second clamping blocks, a plurality of pressure springs, and two sets of push components. The first clamping block and the two second clamping blocks are slidingly embedded in the machine body, and protruding ends are circular-arc. A placement cavity, which is C-shaped, is deployed in the machine body. The plurality of pressure springs are all arranged in the placement cavity and are respectively located at the end portions of the first clamping block and the two second clamping blocks. Ends, close to the ring body, of the plurality of pressure springs are fixedly connected to the end surfaces of the first clamping block and two second clamping blocks. The two sets of push components are symmetrically and slidingly arranged in the placement cavity.

The simultaneous movement of the first clamping block and two second clamping blocks can be achieved by means of the push components. In one embodiment, each of the two sets of push component comprises a push rod, a first push block, a second push block, and a plurality of rollers. The push rod is L-shaped, the plurality of rollers are symmetrically and rotationally installed at both sides of the push rod by hinge pins, and the push rod is slidingly installed in the placement cavity by the plurality of rollers. An end portion of a horizontal section of the push rod is fixedly connected to an end portion of the second clamping block. The first push block is fixedly installed at the left side surface of the first clamping block. The second push block is perpendicularly and fixedly installed at a bottom end of a vertical section of the push rod. The first push block and the second push block are in sliding contact. Surfaces, close to each other, of the first push block and the second push block are both inclined surfaces.

To improve the efficiency of AC-DC electric energy conversion, a bridgeless efficient AC-DC boost converter topology is provided by this design solution. In one embodiment, the AC-DC electric energy conversion component comprises a boost inductor, a first low-frequency switching transistor, a second low-frequency switching transistor, a first high-frequency switching transistor, a second high-frequency switching transistor, a first output diode, a second output diode, a first output capacitor, and a second output capacitor. Two second conductive blocks are fixedly embedded inside bottom sides of the two second clamping blocks, and the two second conductive blocks are electrically connected to the AC-DC electric energy conversion component. Top ends of the two second conductive blocks are groove-shaped, and the two first conductive blocks are respectively clamped with the two second conductive blocks.

A higher output voltage gain can be achieved by employing two boost converter topologies to form an output series connection. In one embodiment, one end of the boost inductor is electrically connected to one end of one second conductive block. A source electrode of the first low-frequency switching transistor and a drain electrode of the second low-frequency switching transistor are electrically connected to another end of the boost inductor. A source electrode of the first high-frequency switching transistor, a drain electrode of the second high-frequency switching transistor, a negative electrode of the first output capacitor and an anode of the second output capacitor are electrically connected to another second conductive block. A drain electrode of the first high-frequency switching transistor and an anode of the first output diode are electrically connected to a drain electrode of the first low-frequency switching transistor. A source electrode of the second high-frequency switching transistor and a cathode of the second output diode are electrically connected to a source electrode of the second-low frequency switching transistor. A cathode of the first output diode is electrically connected to a positive electrode of the first output capacitor and one end of the energy storage component. An anode of the second output diode is electrically connected to a negative electrode of the second output capacitor and another end of the energy storage component.

By utilizing the characteristic that the MOSFET (Metal Oxide Semiconductor Field Effect Transistor) switch has lower on-state loss and lower on-state voltage drop than a rectifier diode. In one embodiment, the first low-frequency switching transistor, the second low-frequency switching transistor, the first high-frequency switching transistor and the second high-frequency switching transistor are MOSFET switches. The energy storage component comprises a plurality of battery packs which are arranged in an interior of the energy storage component and are electrically connected to the energy storage component; and an output end of the energy storage component is electrically connected with a load.

3. Beneficial Effects (1) In the vacuum cavity, the permanent magnet sphere driven by the springs moves back and forth on the guide rod to cut the fixed wire, thus converting kinetic energy into AC electric energy to output. This method for recovering kinetic energy in vacuum can avoid energy loss caused by mechanical resistance and air resistance, thereby improving the efficiency of kinetic energy recovery.

(2) By means of the spring as a damping system, the change of the peak AC output voltage may be smoother, thereby reducing the input dynamic impact on a post-stage AC-DC conversion circuit.

(3) The kinetic energy component is locked by the locking assembly to facilitate the replacement. The compression and elongation of the springs are different due to the different amplitude and strength of the body activities of users. The hardness of the springs in the kinetic energy recovery component should be different according to the body conditions of the users. The kinetic energy recovery component can be conveniently replaced by means of the locking component, thus maximizing the energy recovery function and further improving the efficiency of energy recovery.

(4) By employing a bridgeless efficient AC-DC converter topology in the AC-DC electric energy conversion circuit which mainly utilizes the characteristic that the MOSFET switch has lower on-state loss and lower on-state voltage drop than a rectifier diode, a diode rectifier bridge in the traditional circuit is canceled, and the efficiency of the AC-DC electric energy conversion is improved.

(5) A higher output voltage gain can be achieved by employing two boost converter topologies to form an output series connection, that is, the requirement of rectifying a low-voltage AC input to generate a DC voltage output is met.

Figure 1:
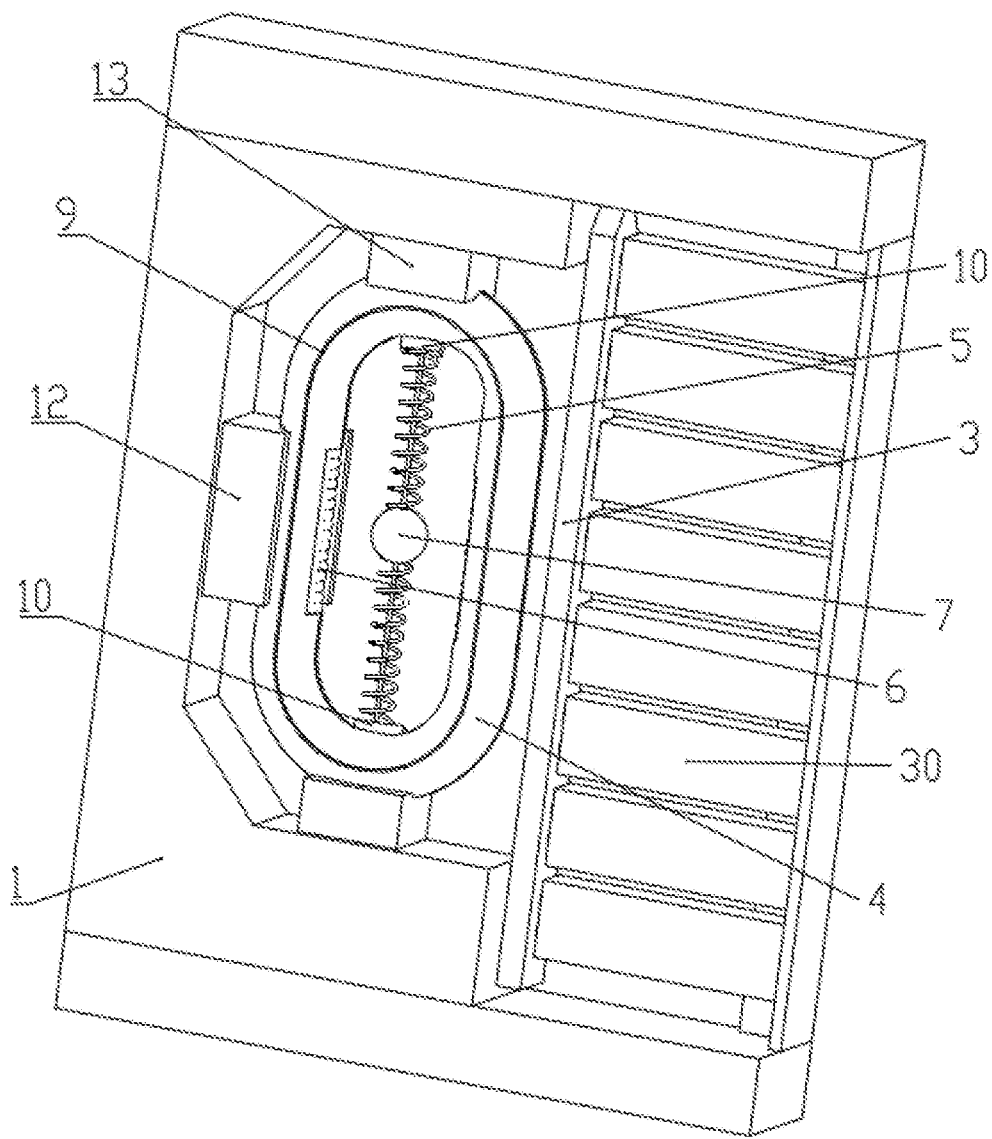
FIG. 1 is a perspective structural schematic diagram of a portable charging device with kinetic energy recovery in accordance with the present disclosure.
Figure 2:
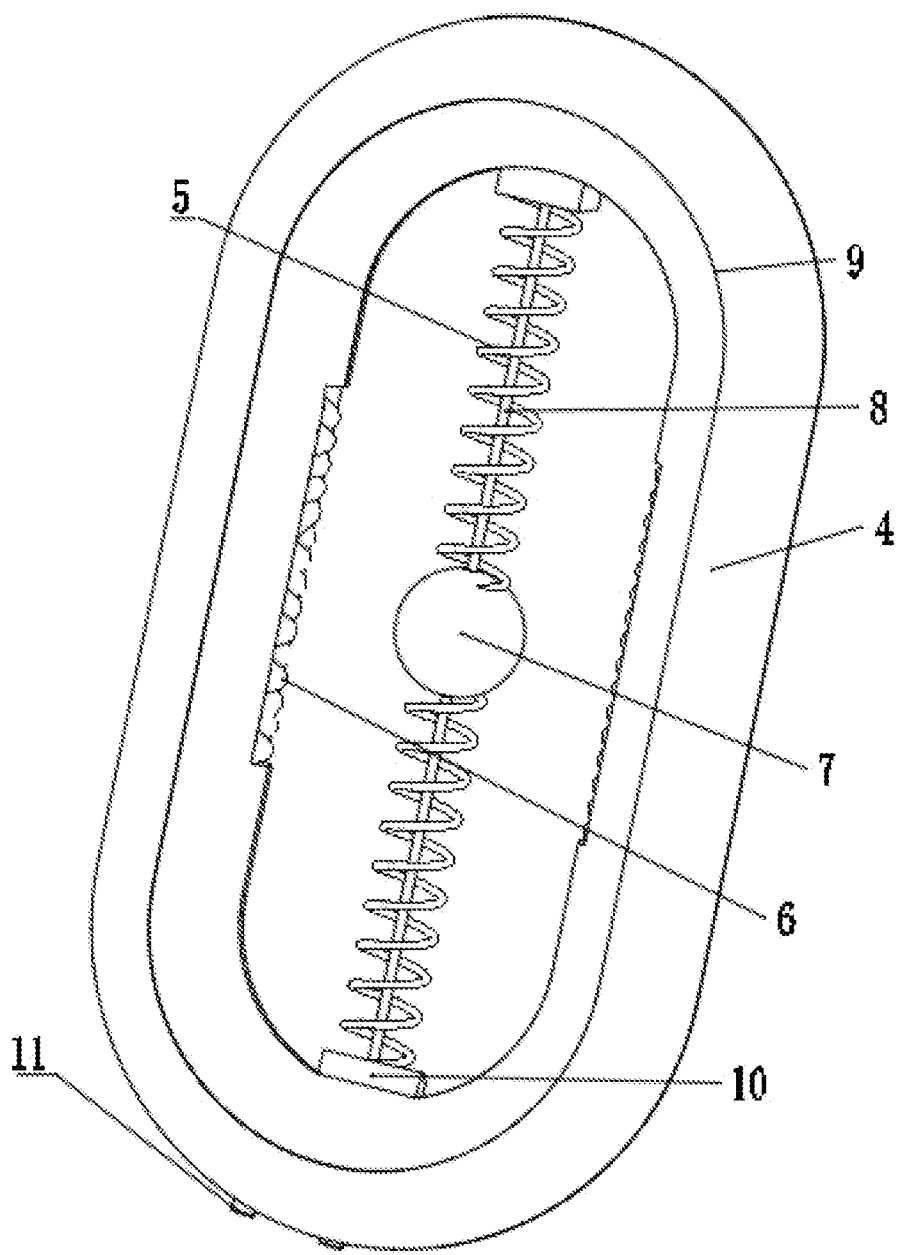
FIG. 2 is a perspective structural schematic diagram of a kinetic energy recovery component in a portable charging device with kinetic energy recovery in accordance with the present disclosure.
Figure 3:
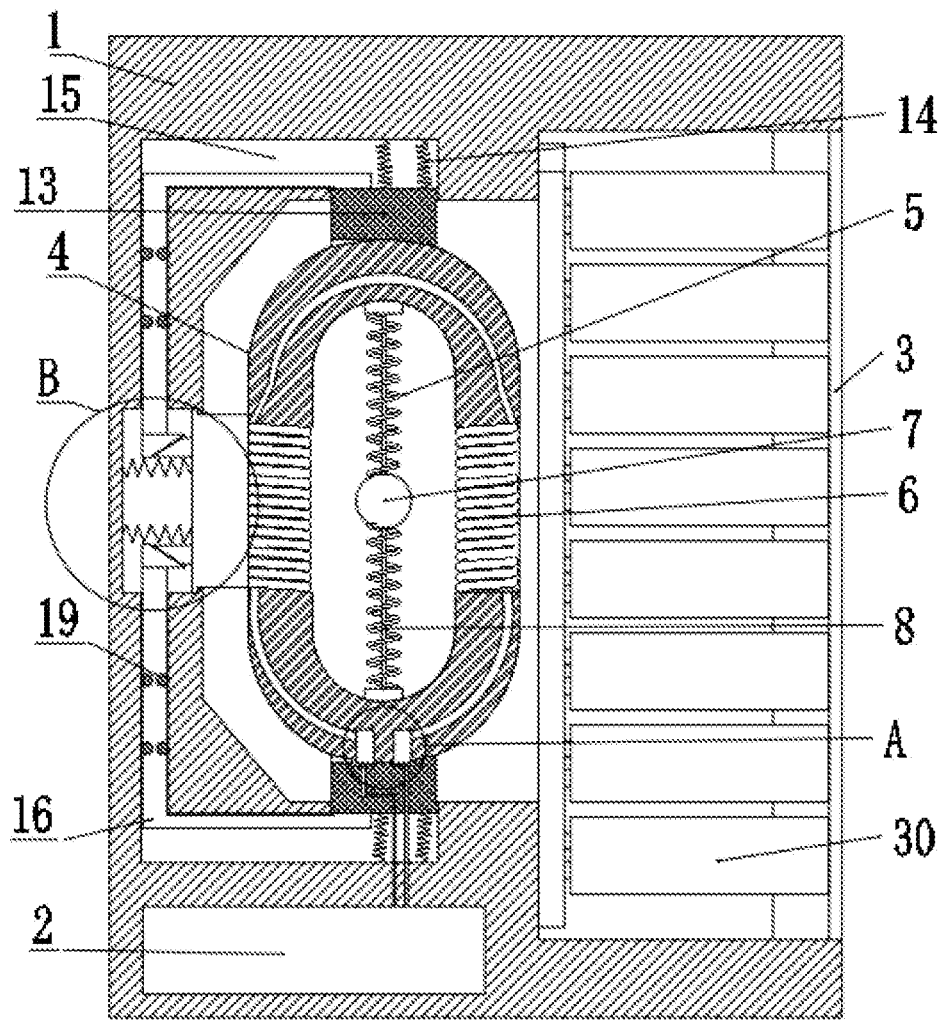
FIG. 3 is a schematic diagram of a front cross-sectional structure of a portable charging device with kinetic energy recovery in accordance with the present disclosure.
Figure 4:
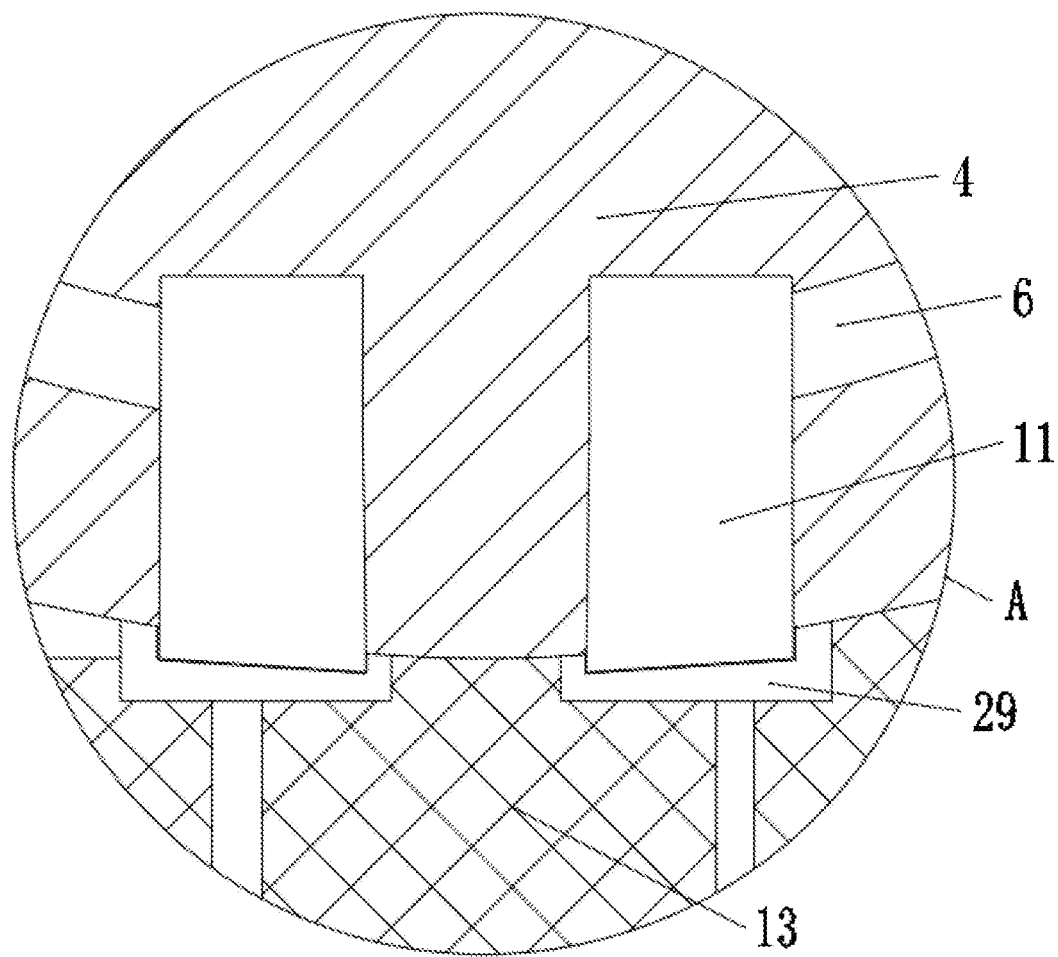
FIG. 4 is an enlarged view of the structure at A of FIG. 3 of a portable charging device with kinetic energy recovery in accordance with the present disclosure.
Figure 5:
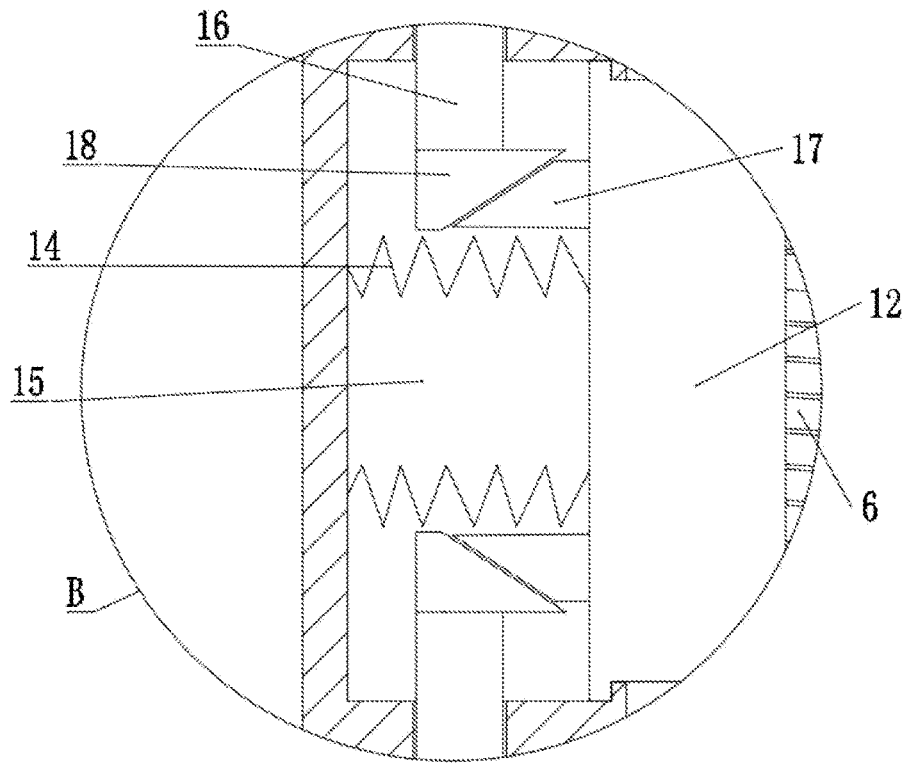
FIG. 5 is an enlarged view of the structure at B of FIG. 3 of a portable charging device with kinetic energy recovery in accordance with the present disclosure.
Figure 6:
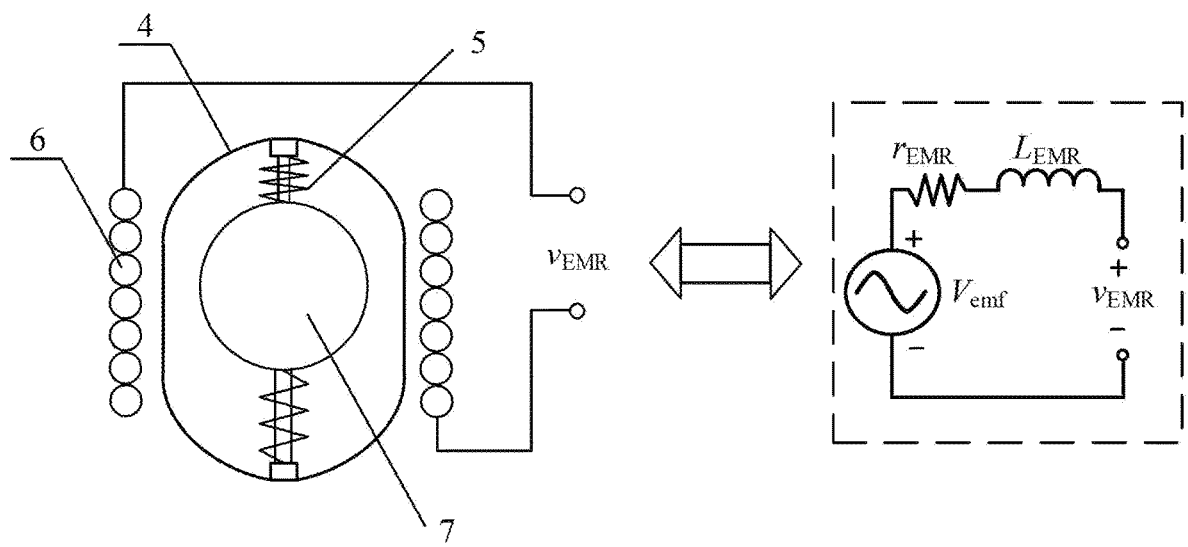
FIG. 6 is a schematic diagram of an equivalent circuit of a kinetic energy recovery component in a portable charging device with kinetic energy recovery in accordance with the present disclosure.
Figure 7:
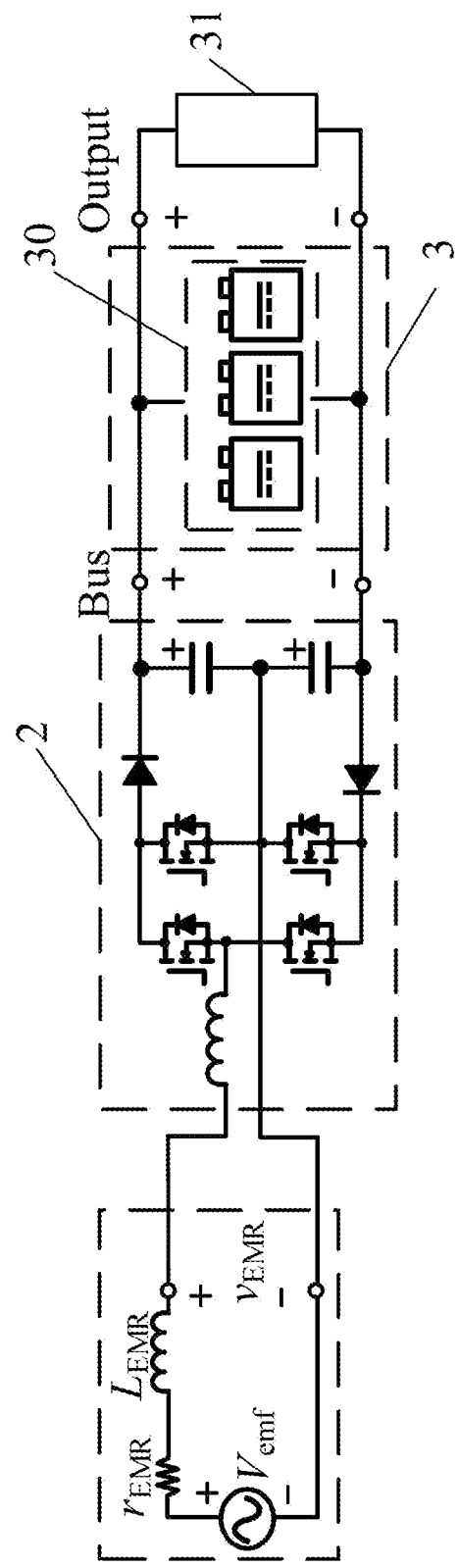
FIG. 7 is an architecture diagram of an electric energy conversion system in a portable charging device with kinetic energy recovery in accordance with the present disclosure.
Figure 8:
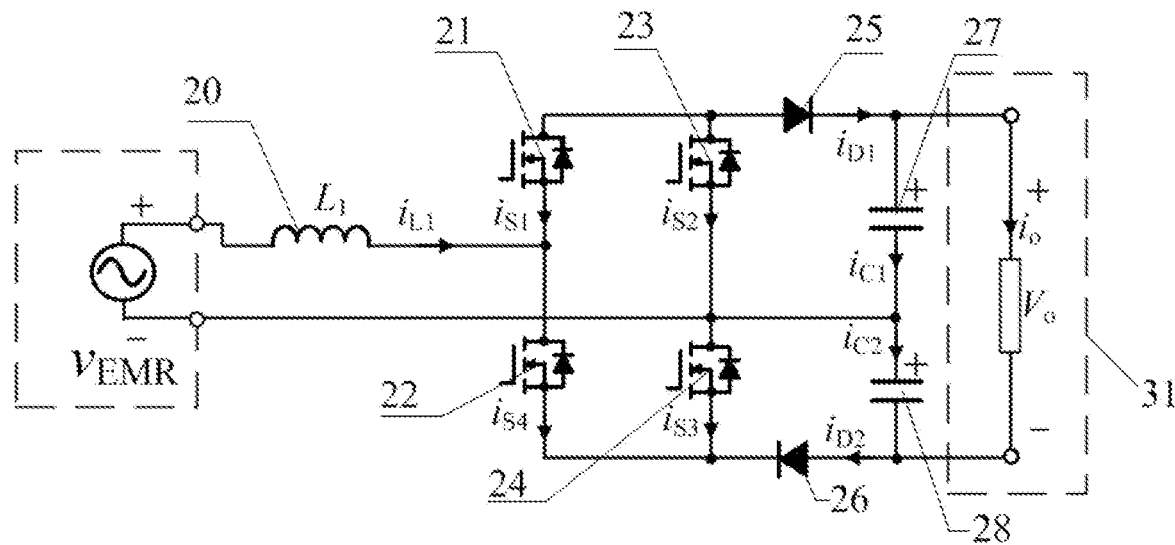
FIG. 8 is an equivalent circuit diagram (comprising a current reference direction) of an AC-DC electric energy conversion component in a portable charging device with kinetic energy recovery in accordance with the present disclosure.
Figure 9:
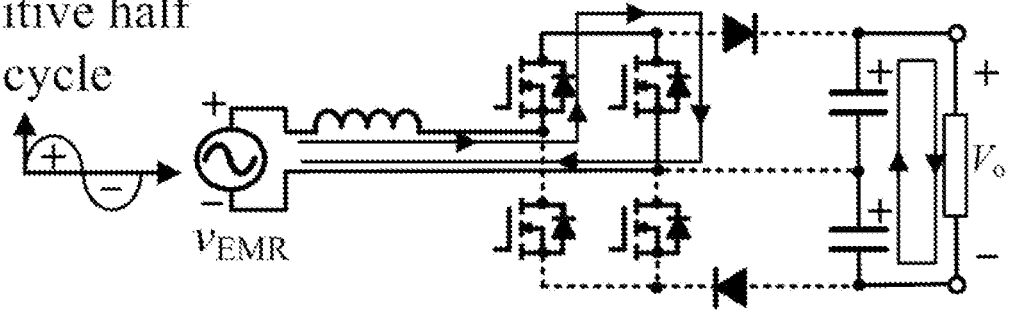
FIG. 9 is an equivalent circuit diagram of an AC-DC electric energy conversion component in a portable charging device with kinetic energy recovery in accordance with the present disclosure in a first operation mode of a positive half operating cycle.
Figure 10:
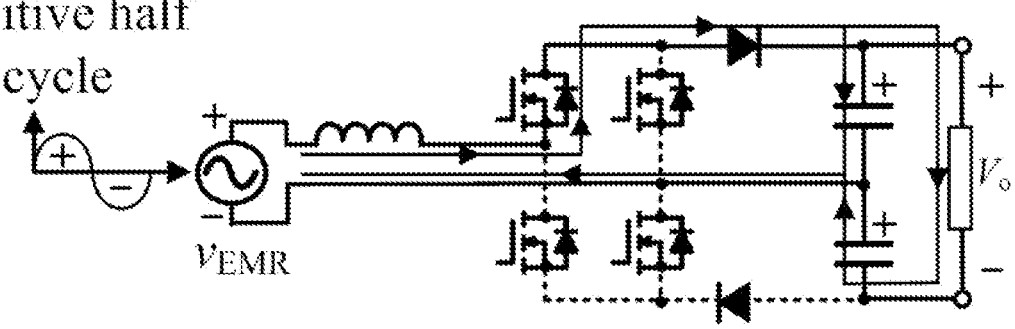
FIG. 10 is an equivalent circuit diagram of an AC-DC electric energy conversion component in a portable charging device with the kinetic energy recovery in accordance with the present disclosure in a second operation mode of a positive half operating cycle.
Figure 11:
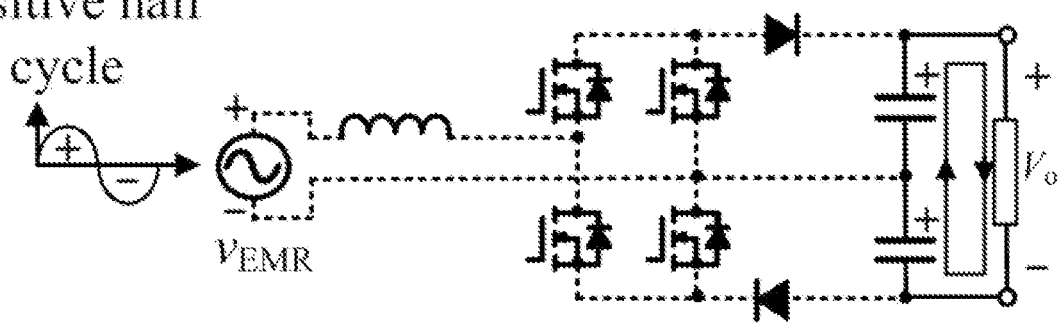
FIG. 11 is an equivalent circuit diagram of an AC-DC electric energy conversion component in a portable charging device with kinetic energy recovery in accordance with the present disclosure in a third operation mode of a positive half operating cycle.
Figure 12:
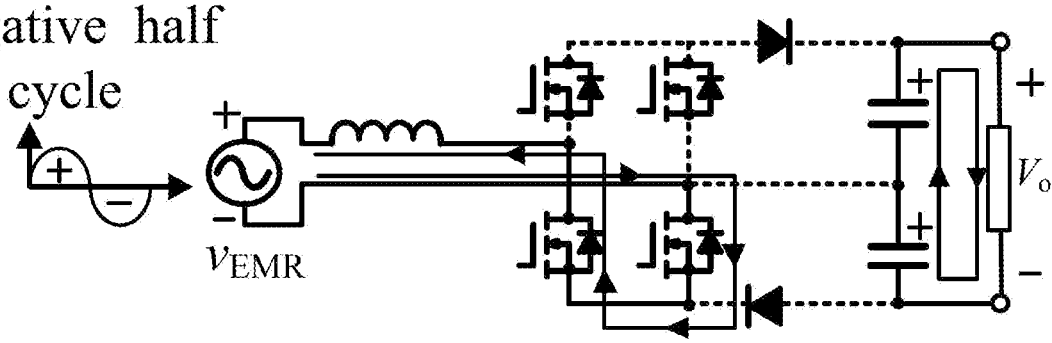
FIG. 12 is an equivalent circuit diagram of an AC-DC electric energy conversion component in a portable charging device with kinetic energy recovery in accordance with the present disclosure in a first operation mode of a negative half operating cycle.
Figure 13:
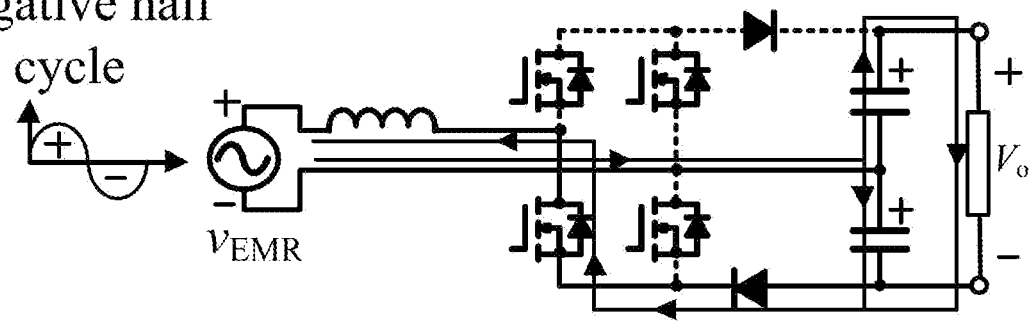
FIG. 13 is an equivalent circuit diagram of an AC-DC electric energy conversion component in a portable charging device with kinetic energy recovery in accordance with the present disclosure in a second operation mode of a negative half operating cycle.
Figure 14:
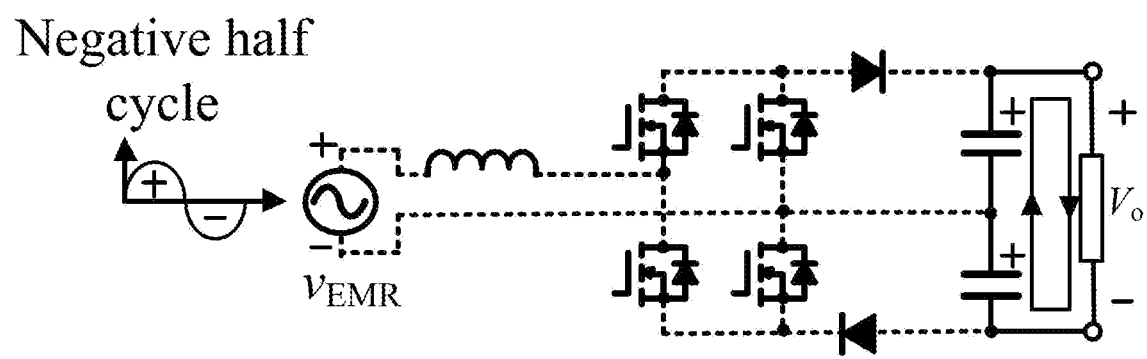
FIG. 14 is an equivalent circuit diagram of an AC-DC electric energy conversion component in a portable charging device with kinetic energy recovery in accordance with the present disclosure in a third operation mode of a negative half operating cycle.
Figure 15:
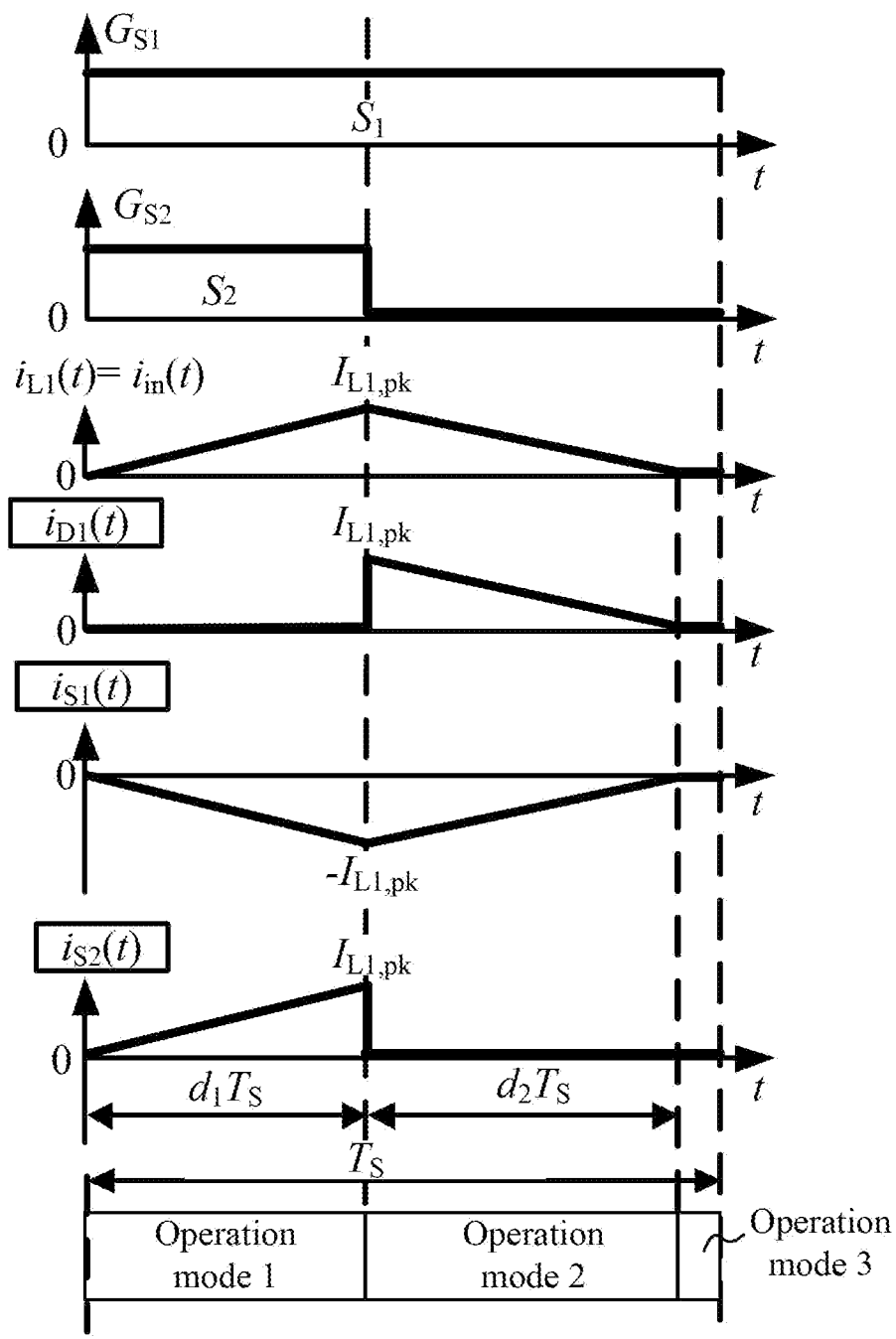
FIG. 15 is a waveform diagram of transistor components of an equivalent circuit in a switching cycle when an AC-DC electrical energy conversion component in the portable charging device with kinetic energy recovery in accordance with the present disclosure operates in a positive half operating cycle.
Figure 16:
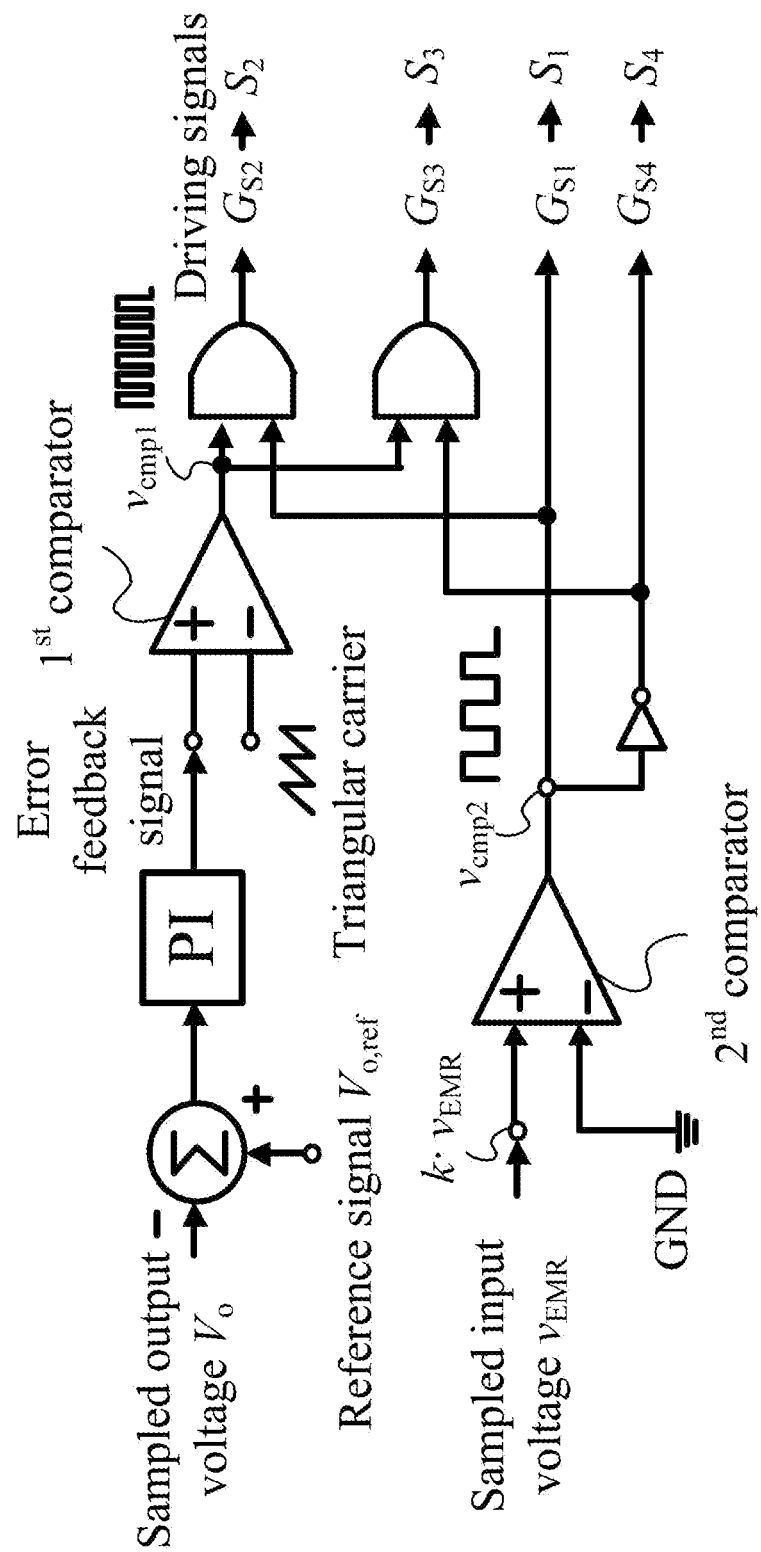
FIG. 16 is a schematic diagram of the control implementation of an AC-DC electric energy conversion component in a portable charging device with kinetic energy recovery in accordance with the present disclosure.
Figure 17:
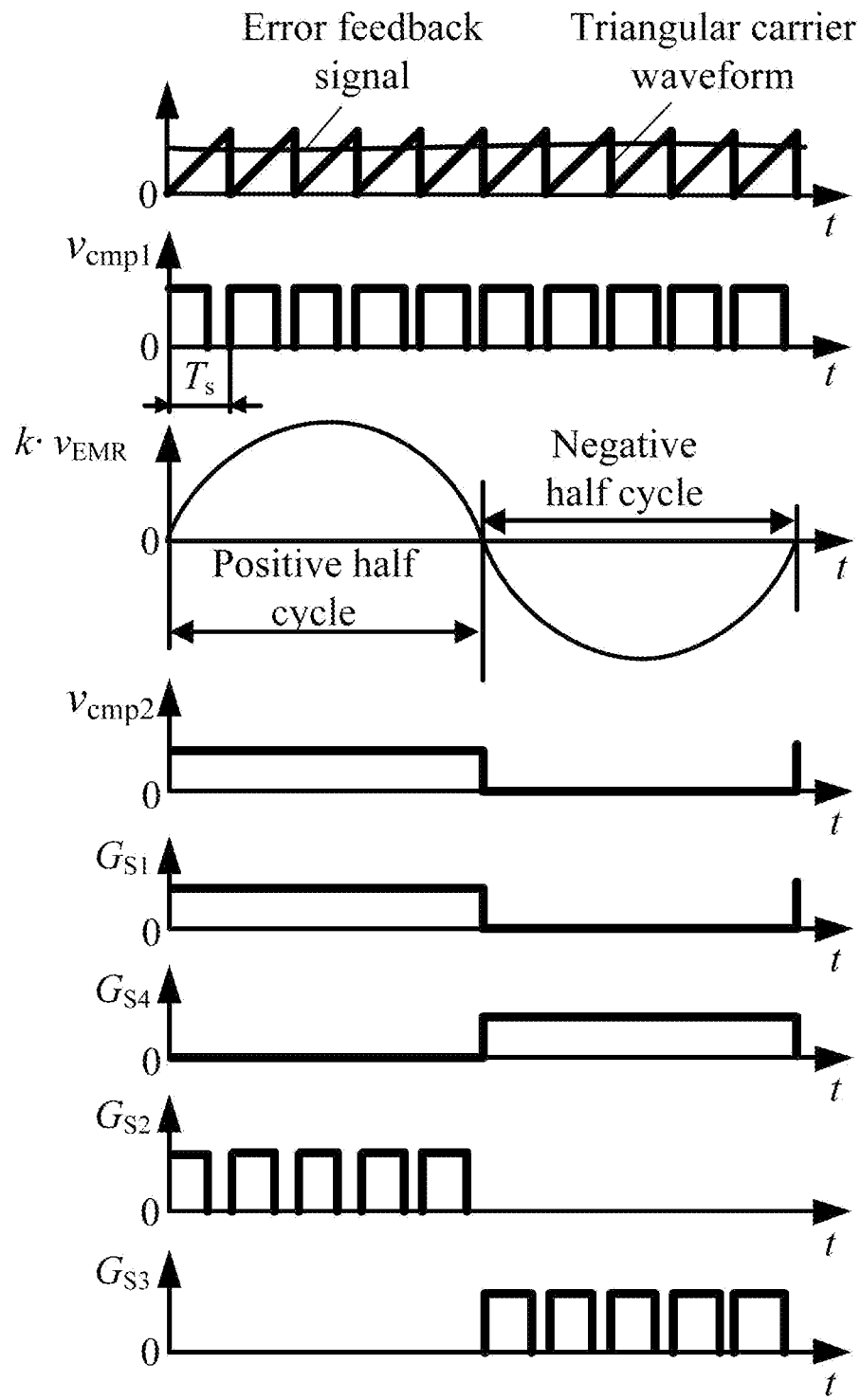
FIG. 17 is a diagram of driving signals of a control implementation circuit of an AC-DC electric energy conversion component in a portable charging device with kinetic energy recovery in accordance with the present disclosure.

In the drawings: 1, machine body; 2, AC-DC electric energy conversion component; 3, energy storage component; 4, ring body; 5, spring; 6, conductor coil; 7, permanent magnet sphere; 8, guide rod; 9, sealing cover; 10, bump; 11, first conductive block; 12, first clamping block; 13, second clamping block; 14, pressure spring; 15, placement cavity; 16, push rod; 17, first push block; 18, second push block; 19, roller; 20, boost inductor; 21, first low-frequency switching transistor; 22, second low-frequency switching transistor; 23, first high-frequency switching transistor; 24, second high-frequency switching transistor; 25, first output diode; 26, second output diode; 27, first output capacitor; 28, second output capacitor; 29, second conductive block; 30, battery pack; 31, load.

DETAILED DESCRIPTION OF THE EMBODIMENTS

The following clearly and completely describes the technical solutions in the embodiments of the present disclosure with reference to the accompanying drawings in the embodiments of the present disclosure. Apparently, the described embodiments are merely a part rather than all of the embodiments of the present disclosure. All other embodiments obtained by a person of ordinary skill in the art based on the embodiments of the present disclosure without creative efforts shall fall within the protection scope of the present disclosure.

Embodiment 1

Referring to FIG. 1 to FIG. 18, a portable charging device with kinetic energy recovery comprises a machine body 1, a kinetic energy recovery component, an AC-DC electric energy conversion component 2, and an energy storage component 3. The kinetic energy recovery component is embedded in the machine body 1 by a locking assembly, and comprises a ring body 4, two springs 5, a conductor coil 6, a permanent magnet sphere 7, a guide rod 8, two sealing covers 9, and two bumps 10. The ring body 4 is oval. The two bumps 10 are symmetrically and fixedly installed inside the ring body 4. The guide rod 8 is perpendicularly arranged between the two bumps 10, and both ends of the guide rod 8 are fixedly nested in the two bumps 10. The guide rod 8 is sleeved slidingly outside by the permanent magnet sphere 7. The guide rod 8 is sleeved outside by the two springs 5; ends, close to each other, of the two springs are fixedly connected to both ends of the permanent magnet sphere 7 respectively, and ends, away from each other, of the two springs 5 are fixedly connected to surfaces, close to each other, of the two bumps 10 respectively. The conductor coil 6 is a wire and is symmetrically, fixedly and hermetically wound on both sides of the ring body 4, and both ends of the conductor coil 6 are electrically connected with first conductive blocks 11, and the two conductive blocks 11 are fixedly embedded in the ring body 4. The two sealing covers 9 are symmetrically and fixedly attached to both sides of the ring body 4, and the middle part of the ring body 4 and the two sealing covers 9 form a vacuum cavity. The energy storage component 3 is arranged at the right side of the machine body 1. The AC-DC electric energy conversion component 2 is arranged at the bottom side of the machine body 1, and the two first conductive blocks 11 are electrically connected to the AC-DC electric energy conversion component 2.

A plurality of battery packs 30 are arranged in the energy storage component 3 and are electrically connected to the energy storage component 3, and the output end of the energy storage component 3 is electrically connected with a load 31.

When a human body moves carrying with the machine body 1, along with the movement or vibration of the human body, in the vacuum cavity, the permanent magnet sphere 7 driven by the springs 5 moves back and forth in a longitudinal direction under the support of the guide rod 8, thus generating a varying magnetic field in a space of the fixed conductor coil 6. Electrons inside the fixed conductor coil 6, under the action of the varying magnetic field, will generate a weak AC electromotive force Vemr at a port following Faraday's law of electromagnetic induction, and the AC alternating frequency and the peak AC voltage of the Vemr are influenced by the length and radian of the spring 5, the motion frequency of the human and the like. As the sealing covers 9 and the ring body 4 form the sealed vacuum cavity, the energy loss caused by the mechanical and air resistance is avoided, and the efficiency of kinetic energy recovery is improved. Due to the existence of the guide rod 8, the permanent magnet sphere 7 may only move in the longitudinal direction to further improve the efficiency of energy recovery.

According to disclosed literatures, it can be regarded that the Vemr has the AC frequency of 10 to 100 Hz, and the peak AC voltage of 1.5 to 4.5 V. The AC voltage Vmer passes through a bridgeless boost converter again to achieve efficient rectification and voltage-stabilizing output, such that a 5V DC output voltage is generated to charge the battery pack 30 and supply power to the load 31.

Due to mutual cooperation of the two springs 5, the change of the peak AC output voltage may be smoother, thereby reducing the input dynamic impact on the post-stage AC-DC conversion circuit.

Embodiment 2

What is different from the embodiment 1 lies in that: the locking assembly comprises a first clamping block 12, two second clamping blocks 13, a plurality of pressure springs 14, and two sets of push components. The first clamping block 12 and two second clamping blocks 13 are slidingly embedded in the machine body 1, and protruding ends are all circular-arc. The arc surface can limit the ring body 4 in a horizontal position to prevent the ring body from self-shaking. A placement cavity 15, which is C-shaped, is formed in the machine body 1. The plurality of pressure springs 14 are arranged in the placement cavity 15 and are respectively located at the end portions of the first clamping block 12 and two second clamping blocks 13. The ends, close to the ring body 4, of the plurality of pressure springs 14 are respectively fixedly connected to the end surfaces of the first clamping block 12 and two second clamping blocks 13. The two sets of push components are symmetrically and slidingly arranged in the placement cavity 15.

Each push component comprises a push rod 16, a first push block 17, a second push block 18, and a plurality of rollers 19. The push rod 16 is L-shaped, the plurality of rollers 19 are symmetrically and rotationally installed at both sides of the push rod 16 by hinge pins, and the push rod 16 is slidingly installed in the placement cavity 15 by the plurality of rollers 19. The end portion of a horizontal section of the push rod 16 is fixedly connected to the end portion of the second clamping block 13. The first push block 17 is fixedly installed at the left side surface of the first clamping block 12, the second push block 18 is perpendicularly installed at the bottom end of a vertical section of the push rod 16, the first push block 17 and the second push block 18 are in sliding contact, and the surfaces, close to each other, of the first push block and the second push block are inclined surfaces.

The compression and elongation of the springs 5 are different due to the different amplitude and strength of the body activities of users. In order to obtain an excellent energy recovery effect, the springs 5 with different hardness should be provided based on the body conditions of the users. Due to the fact that the springs 5 are in a vacuum environment, it is inconvenient to replace the springs 5 separately, and the entire kinetic energy recovery component needs to be replaced. During replacement, the ring body 4 is pushed leftwards, the ring body 4 moves to drive the first clamping block 12 to move, the first clamping block 12 drives the two first push blocks 17 to move, and the two first push blocks 17 move horizontally to drive the two second push blocks 18 to be away from each other; the two second push blocks 18 are away from each other to drive the two push rods 16 to be away from each other, and the two push rods 16 respectively drive the two second clamping blocks 13 to be away from each other, which makes the first clamping block 12 and the two second clamping blocks 13 unlock the ring body 4 simultaneously. The plurality of pressure springs 14 are compressed when the first clamping block 12 and the second clamping blocks 13 move, and the plurality of pressure springs 14 are elongated after the ring body 4 is taken out, which resets the first clamping block 12 and the two second clamping blocks 13. During the installation of the kinetic energy recovery component, the ring body 4 is in contact with the first clamping block 12 and pushes the first clamping block 12 to again make the first clamping block 12 and the two second clamping blocks 13 away from each other, which results in locking the ring body 4 to achieve replacement. By this way, the kinetic energy recovery component can be conveniently replaced to maximize the function of energy recovery and to further improve the efficiency of energy recovery.

Embodiment 3

What is different from the embodiment 1 lies in that, the AC-DC electric energy conversion component 2 comprises a boost inductor 20, a first low-frequency switching transistor 21, a second low-frequency switching transistor 22, a first high-frequency switching transistor 23, a second high-frequency switching transistor 24, a first output diode 25, a second output diode 26, a first output capacitor 27, and a second output capacitor 28. Two second conductive blocks 29 are fixedly embedded inside the bottom sides of the two second clamping blocks 13 and are electrically connected to the AC-DC electric energy conversion component 2. The tops of the two second conductive blocks 29 are groove-shaped, and the two first conductive blocks 11 are respectively clamped with the two second conductive blocks 29. During the replacement of the kinetic energy recovery component, the first conductive blocks 11 are clamped with the second conductive blocks 29 to turn on a circuit. The AC-DC electric energy conversion component 2 is actually a bridgeless efficient AC-DC boost converter topology proposed by this design solution.

One end of the boost inductor 20 is electrically connected to one end of one second conductive block 29. A source electrode of the first low-frequency switching transistor 21 and a drain electrode of the second low-frequency switching transistor 22 are electrically connected to another end of the boost inductor 20. A source electrode of the first high-frequency switching transistor 23, a drain electrode of the second high-frequency switching transistor 24, a negative electrode of the first output capacitor 27 and an anode of the second output capacitor 28 are electrically connected to another second conductive block 29. A drain electrode of the first high-frequency switching transistor 23 and an anode of the first output diode 25 are electrically connected to a drain electrode of the first low-frequency switching transistor 21. A source electrode of the second high-frequency switching transistor 24 and a cathode of the second output diode 26 are electrically connected to a source electrode of the second low-frequency switching transistor 22. A cathode of the first output diode 25 is electrically connected to a positive electrode of the first output capacitor 27 and one end of the energy storage component 3. An anode of the second output diode 26 is electrically connected to a negative electrode of the second output capacitor 28 and the other end of the energy storage component 3.

The first low-frequency switching transistor 21, the second low-frequency switching transistor 22, the first high-frequency switching transistor 23 and the second high-frequency switching transistor 24 are MOSFET switches. The energy storage component 3 comprises a plurality of battery packs 30 which are arranged in an interior of the energy storage component 3, and the plurality of battery packs 30 are electrically connected to the energy storage component 3, and an output end of the energy storage component 3 is electrically connected with a load 31.

As the positive half cycle and the negative half cycle have similar operation modes, the following only takes the operation mode of the positive half cycle as an example to introduce an operating principle of the system.

First operation mode [0, d1TS]: at this stage, the first low-frequency switching transistor 21 and the first high-frequency switching transistor 23 are in on-state, the input side transfers the energy to the boost inductor 20, a current iL1 of the boost inductor 20 rises linearly, and a current of the first low-frequency switching transistor 21 and the iL1 have the same amplitude but opposite directions.

Second operation mode [d1TS, d1TS+d2TS]: when the first high-frequency switching transistor 23 is turned off, the second operation mode starts, a peak inductor current is IL1, pk, the first low-frequency switching transistor 21 is still in on-state, the first output diode 25 is turned on, the input side and the energy stored in the boost inductor 20 commonly supply energy to the load 31, the current iL1 of the boost inductor 20 linearly drops, and the current of the first low-frequency switching transistor 21 and the iL1 have the same amplitude but opposite directions.

Third operation mode [d1TS+d2TS, TS]: when the current iL1 of the boost inductor 20 linearly drops to zero, the third operation mode starts, the first low-frequency switching transistor 21, the first high-frequency switching transistor 23 and the first output diode 25 are all in off-state, and no energy exchange exists between the input side and the output side at this stage.

Due to the existence of the first output diode 25 and the second output diode 26 in the bridgeless boost converter topology in the present disclosure, the situation that the output voltage is short-circuited as the same bridge arm is simultaneously turned on is avoided, and thus there is no need to provide a dead zone of the same bridge arm, which simplifies the overall control of the system. A specific control method includes:

comparing a sampling signal of an output voltage Vo with an output reference voltage Vo, ref, and adjusting PI parameters to obtain an error feedback signal, then comparing the error feedback signal with a triangular wave to generate an output signal vcomp1 of a first comparator;

on the other hand, comparing a sampling signal of an input voltage vEMR with a reference signal "0" to generate an output signal vcomp2 of a second comparator;

enabling the vcomp2 and the vcomp1 to pass through an AND gate to generate a driving signal of the first high-frequency switching transistor 23;

enabling the vcomp2 to pass through an OR gate to pass through an AND gate with the vcomp1 to generate the driving signal of the first high-frequency switching transistor 23;

the vcomp2 serving as a driving signal of the first low-frequency switching transistor 21; and the vcomp2 passing through an OR gate to be as a driving signal of the second low-frequency switching transistor 22.

It needs to be noted that the high frequency of each of the first high-frequency switching transistor 23 and the second high-frequency switching transistor 24 indicates that the control signal thereof is in a higher frequency switchover, which is decided by a switching frequency designed for the converter (e.g., 47 kHz, 65 kHz and the like). A control signal of each of the first low-frequency switching transistor 21 and the second low-frequency switching transistor 23 is in a low-frequency change, which is decided by an operating frequency of the input voltage (e.g., 20 to 100 Hz).

To verify the circuit feasibility of the AC-DC electric energy conversion component 2 of the present disclosure, PSIM simulation software is employed to perform simulation verification on the circuit. Specific parameters are described as follows: AC input employs sinusoidal signal fitting, a peak AC voltage is 2.2 V, the frequency is 10 Hz, a value of the boost inductor 20 is 20 uH, the values of the first output capacitor 27 and the second output capacitor 28 both are 200 uF, an output voltage is 5 V, a value of the load 31 is 1000Ω, the power is 25 mW, the switching frequency is 47 kHz, and in the PI parameters, the P is 0.02, and the I is 0.005.

Figure 18:
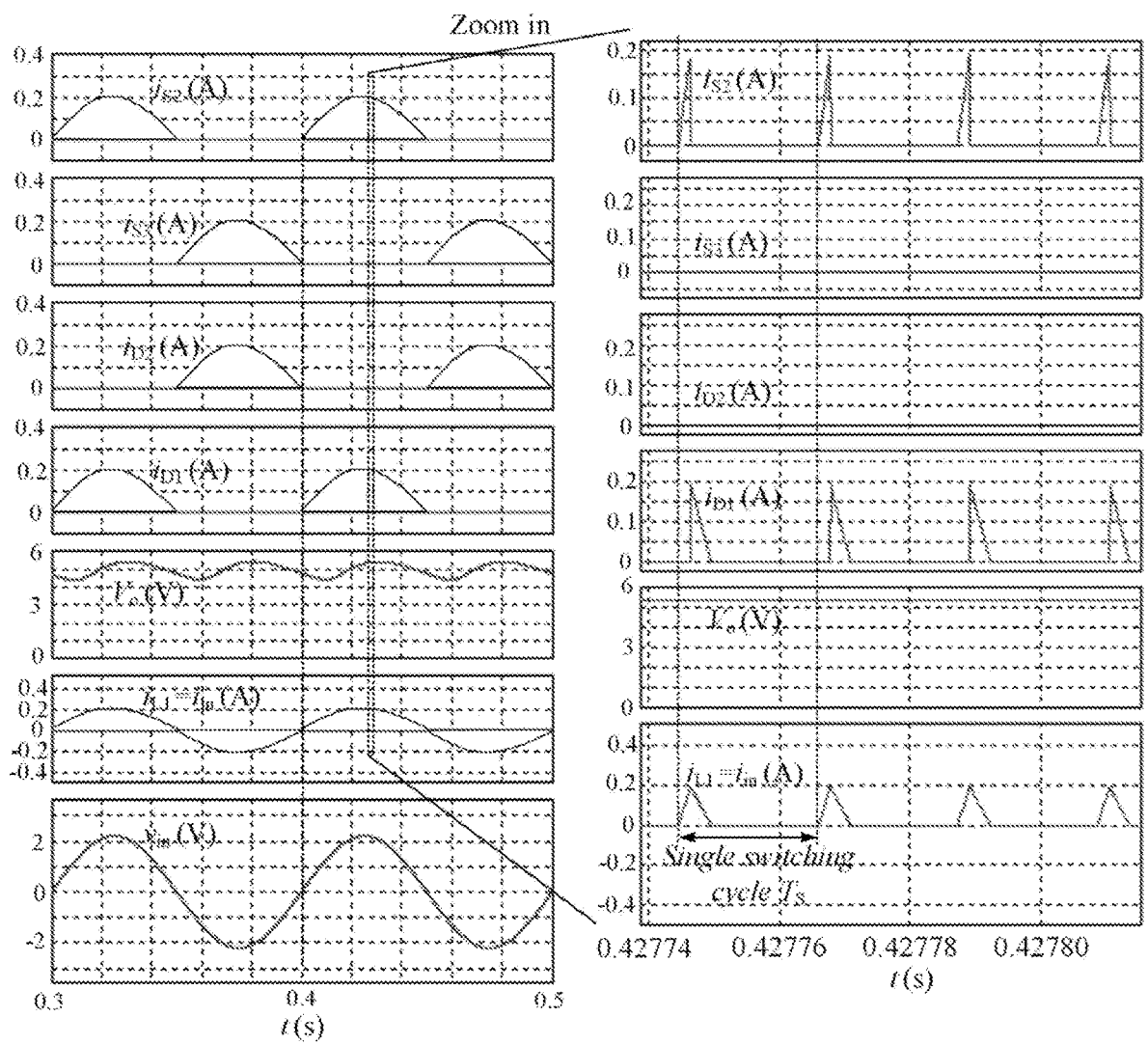
FIG. 18 is a waveform simulation diagram of key devices of an AC-DC electric energy conversion component in a portable charging device with kinetic energy recovery in accordance with the present disclosure.

It can be known from FIG. 18 that under the conditions of the peak AC input of 2.2 V and the frequency of 10 Hz, the 5 V voltage-stabilizing output is achieved by the bridgeless boost converter. The first high-frequency switching transistor 23 and the second high-frequency switching transistor 24 alternately operate in the positive half cycle and the negative half cycle of the input voltage vin respectively, thus achieving AC-DC conversion operation when no rectifier bridge exists. Moreover, various devices are stable in simulated waveforms, indicating that the converter can operate stably, and the simulated waveform of each device is consistent with a theoretical waveform shown in FIG. 15.

By employing a bridgeless efficient AC-DC converter topology in the AC-DC electric energy conversion circuit which mainly utilizes the characteristic that the MOSFET switch has lower on-state loss and lower on-state voltage drop than a rectifier diode, and cancels a diode rectifier bridge in the traditional circuit, the efficiency of the AC-DC electric energy conversion is improved. A higher output voltage gain can be achieved by employing two boost converter topologies to form an output series connection, that is, the requirement of rectifying a low-voltage AC input to generate a DC voltage output is met.

It needs to be noted that the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element defined by "comprises a . . . " does not, without more constraints, preclude the existence of additional identical elements in the process, method, article, or apparatus that comprises the element.

Although the embodiments of the present disclosure have been shown and described, those of ordinary skill in the art may appreciate that various changes, modifications, substitutions, and variations may be made to these embodiments without departing from the principles and spirit of the present disclosure, the scope of the present disclosure is defined by the appended claims and their equivalents.

What is claimed is:

1. A portable charging device with kinetic energy recovery, comprising a machine body, a kinetic energy recovery component, an alternating current-direct current (AC-DC) electric energy conversion component, and an energy storage component, wherein the kinetic energy recovery component is embedded in the machine body by a locking assembly; and the kinetic energy recovery component comprises a ring body, a conductor coil, a permanent magnet sphere, and two sealing covers, wherein the ring body is oval, the two sealing covers are symmetrically and fixedly attached to both sides of the ring body, and a middle part of the ring body and the two sealing covers form a vacuum cavity; the permanent magnet sphere is able to reciprocate up and down in the vacuum cavity; the conductor coil is a wire and is symmetrically, fixedly and hermetically wound on both sides of the ring body; both ends of the conductor coil are electrically connected with two first conductive blocks; the two first conductive blocks are fixedly embedded in the ring body; the energy storage component is arranged at the right side of the machine body; the AC-DC electric energy conversion component is arranged at a bottom side of the machine body; and the two first conductive blocks are electrically connected to the AC-DC electric energy conversion component.

2. The portable charging device with kinetic energy recovery according to claim 1, wherein the kinetic energy recovery component further comprises two springs, a guide rod, and two bumps; wherein the two bumps are symmetrically and fixedly installed in the vacuum cavity inside the ring body; the guide rod is perpendicularly arranged between the two bumps, and both ends of the guide rod are respectively nested in the two bumps; the guide rod is slidingly sleeved outside by the permanent magnet sphere; the guide rod is sleeved outside by the two springs; ends, close to each other, of the two springs are fixedly connected to both ends of the permanent magnet sphere respectively; and ends, away from each other, of the two springs are fixedly connected to surfaces, close to each other, of the two bumps respectively.

3. The portable charging device with kinetic energy recovery according to claim 1, wherein the locking assembly comprises a first clamping block, two second clamping blocks, a plurality of pressure springs, and two sets of push components; wherein the first clamping block and the two second clamping blocks are slidingly embedded in the machine body, and protruding ends are circular-arc; a placement cavity, which is C-shaped, is deployed in the machine body; the plurality of pressure springs are all arranged in the placement cavity and are respectively located at end portions of the first clamping block and the two second clamping blocks; ends, close to the ring body, of the plurality of pressure springs are fixedly connected to end surfaces of the first clamping a block and the two second clamping blocks respectively; and the two sets of push components are symmetrically and slidingly arranged in the placement cavity.

4. The portable charging device with kinetic energy recovery according to claim 3, wherein each of the two sets of push components comprises a push rod, a first push block, a second push block, and a plurality of rollers; wherein the push rod is L-shaped; the plurality of rollers are symmetrically and rotationally installed at both sides of the push rod by hinge pins; the push rod is slidingly installed in the placement cavity by the plurality of rollers; an end portion of a horizontal section of the push rod is fixedly connected to an end portion of the second clamping block; the first push block is fixedly installed at a left side surface of the first clamping block; the second push block is perpendicularly and fixedly installed at a bottom end of a vertical section of the push rod; the first push block and the second push block are in sliding contact; and surfaces, close to each other, of the first push block and the second push block both are inclined surfaces.

5. The portable charging device with kinetic energy recovery according to claim 3, wherein two second conductive blocks are fixedly embedded inside bottom sides of the two second clamping blocks; the two second conductive blocks are electrically connected to the AC-DC electric energy conversion component; top ends of the two second conductive blocks are groove-shaped; and the two first conductive blocks are respectively clamped with the two second conductive blocks.

6. The portable charging device with kinetic energy recovery according to claim 5, wherein the AC-DC electric energy conversion component comprises a boost inductor, a first low-frequency switching transistor, a second low-frequency switching transistor, a first high-frequency switching transistor, a second high-frequency switching transistor, a first output diode, a second output diode, a first output capacitor, and a second output capacitor; wherein one end of the boost inductor is electrically connected to one end of one second conductive block; a source electrode of the first low-frequency switching transistor and a drain electrode of the second low-frequency switching transistor are electrically connected to another end of the boost inductor; a source electrode of the first high-frequency switching transistor, a drain electrode of the second high-frequency switching transistor, a negative electrode of the first output capacitor and an anode of the second output capacitor are electrically connected to another second conductive block; a drain electrode of the first high-frequency switching transistor and an anode of the first output diode are electrically connected to a drain electrode of the first low-frequency switching transistor; a source electrode of the second high-frequency switching transistor and a cathode of the second output diode are electrically connected to a source electrode of the second low-frequency switching transistor; a cathode of the first output diode is electrically connected to a positive electrode of the first output capacitor and one end of the energy storage component; and an anode of the second output diode is electrically connected to a negative electrode of the second output capacitor and another end of the energy storage component.

7. The portable charging device with kinetic energy recovery according to claim 6, wherein the first low-frequency switching transistor, the second low-frequency switching transistor, the first high-frequency switching transistor and the second high-frequency switching transistor are MOSFET (Metal Oxide Semiconductor Field Effect Transistor) switches; the energy storage component comprises a plurality of battery packs which are arranged in an interior of energy storage component, and the plurality of battery packs are electrically connected to the energy storage component; and an output end of the energy storage component is electrically connected with a load.

* * * * *